United States Patent
Koo et al.

(10) Patent No.: US 8,116,351 B2
(45) Date of Patent: Feb. 14, 2012

(54) DOWNLINK POWER CONTROL WITH LIMIT TO DYNAMIC RANGE USING DETECTION OF DOWNLINK TRANSMIT POWER

(75) Inventors: Chang-Soo Koo, Melville, NY (US); Angelo Cuffaro, Laval (CA); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 265 days.

(21) Appl. No.: 12/615,761

(22) Filed: Nov. 10, 2009

(65) Prior Publication Data
US 2010/0056169 A1 Mar. 4, 2010

Related U.S. Application Data

(63) Continuation of application No. 10/901,795, filed on Jul. 29, 2004, now Pat. No. 7,616,677.

(60) Provisional application No. 60/491,187, filed on Jul. 30, 2003.

(51) Int. Cl.
*H04L 27/30* (2006.01)
(52) U.S. Cl. ........ 375/141; 375/146; 375/147; 370/252; 370/318; 455/13.4; 455/127.1; 455/522
(58) Field of Classification Search ................. 375/140, 375/141, 146, 147; 370/252, 318, 320, 342, 370/441; 455/13.4, 522, 127.1
See application file for complete search history.

(56) References Cited

U.S. PATENT DOCUMENTS

| | | | |
|---|---|---|---|
| 6,285,886 B1 | 9/2001 | Kamel et al. | |
| 6,529,482 B1 | 3/2003 | Lundby | |
| 6,549,785 B1 | 4/2003 | Agin | |
| 6,690,944 B1 | 2/2004 | Lee et al. | |
| 6,735,247 B2 * | 5/2004 | Lundby | 375/227 |
| 6,760,598 B1 | 7/2004 | Kurjenniemi | |
| 6,763,244 B2 | 7/2004 | Chen et al. | |
| 6,771,965 B2 * | 8/2004 | Hamabe | 455/442 |
| 6,862,458 B2 | 3/2005 | Kanemoto et al. | |
| 7,010,317 B2 * | 3/2006 | Hwang et al. | 455/522 |
| 7,010,321 B2 | 3/2006 | Chi et al. | |
| 7,340,268 B2 | 3/2008 | Oh et al. | |

(Continued)

FOREIGN PATENT DOCUMENTS

DE 199 38 494 3/2001
(Continued)

OTHER PUBLICATIONS

Baker et al. "Power Control in UTMS Release '99." International Conference on 3G Mobile Communication Technologies. No. 471, 1999, pp. 36-40, XP000900538.

*Primary Examiner* — Dac V Ha
(74) *Attorney, Agent, or Firm* — Volpe and Koenig, P.C.

(57) ABSTRACT

An apparatus and method is provided for dynamic range power control of a wireless downlink communication signal, such that target signal quality adjustments are held temporarily when it is apparent that transmit power control commands will not produce the desired response at the transmitting station. Comparisons of measured received signals to thresholds are performed to determine whether the transmitting station has either reached the maximum or minimum transmit power, in which case the target signal quality adjustment is controlled accordingly. When normal transmit power is detected, the target signal quality adjustments are allowed to resume as usual.

6 Claims, 5 Drawing Sheets

U.S. PATENT DOCUMENTS

| | | |
|---|---|---|
| 7,428,424 B2 | 9/2008 | Hwang et al. |
| 2002/0010001 A1 | 1/2002 | Dahlman et al. |
| 2002/0064135 A1 | 5/2002 | Chen et al. |
| 2003/0058821 A1 | 3/2003 | Lee et al. |
| 2003/0207696 A1 | 11/2003 | Willenegger et al. |
| 2004/0038699 A1 | 2/2004 | Toono |
| 2004/0106425 A1 | 6/2004 | Koo et al. |
| 2004/0152423 A1 | 8/2004 | Reznik |
| 2004/0157636 A1 | 8/2004 | Koo et al. |
| 2004/0235510 A1 | 11/2004 | Elicegui et al. |
| 2004/0242161 A1 | 12/2004 | Marinier |
| 2004/0248581 A1 | 12/2004 | Seki et al. |
| 2008/0108315 A1 | 5/2008 | Hamalainen |

FOREIGN PATENT DOCUMENTS

| | | |
|---|---|---|
| EP | 1054518 | 11/2000 |
| EP | 1128578 | 8/2001 |
| EP | 1139580 | 11/2001 |
| EP | 1164714 | 12/2001 |
| EP | 1237296 | 9/2002 |
| EP | 1322048 | 6/2003 |
| WO | 00/03487 | 1/2000 |

* cited by examiner

DOWNLINK POWER CONTROL WITH LIMIT TO DYNAMIC RANGE USING DETECTION OF DOWNLINK TRANSMIT POWER

CROSS REFERENCE TO RELATED APPLICATION(S)

This application is a continuation of U.S. application Ser. No. 10/901,795, filed Jul. 29, 2004, which claims priority from U.S. provisional application No. 60/491,187, filed Jul. 30, 2003, which is incorporated by reference as if fully set forth.

FIELD OF INVENTION

The invention generally relates to wireless communication systems. In particular, the invention relates to power control in such systems.

BACKGROUND

The terms base station, wireless transmit/receive unit (WTRU) and mobile unit are used in their general sense. As used herein, a wireless transmit/receive unit (WTRU) includes, but is not limited to, a user equipment, mobile station fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. When referred to hereafter, a base station is a WTRU that includes, but is not limited to, a base station, Node B, site controller, access point, or other interfacing device in a wireless environment.

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute-Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1:
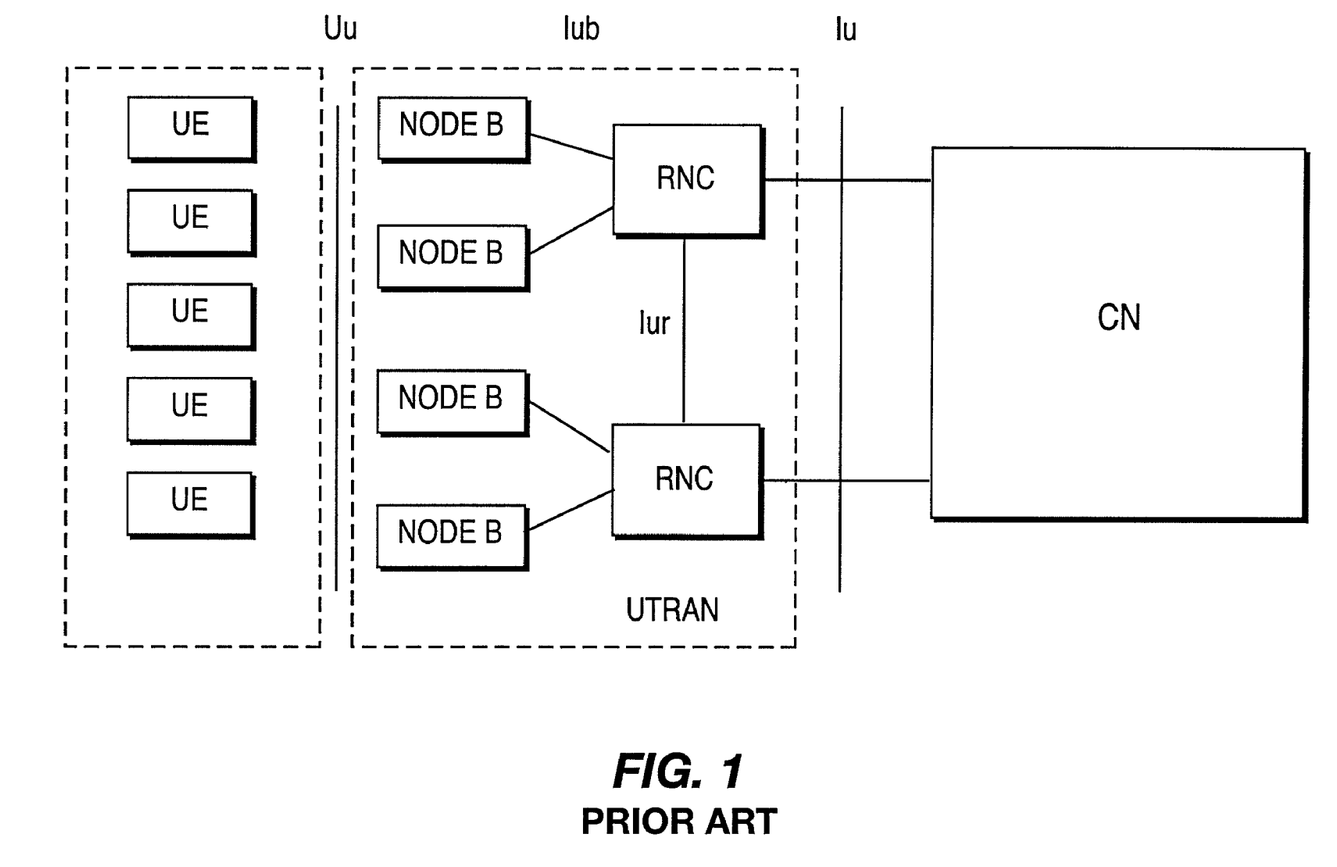
FIG. 1 shows an overview of the system architecture of a conventional UMTS network.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), shown as user equipments (UEs) as in 3GPP, via a radio interface known as Uu. The UTRAN has one or more radio network controllers (RNCs) and base stations, shown as Node Bs as in 3GPP, which collectively provide for the geographic coverage for wireless communications with UEs. One or more Node Bs is connected to each RNC via an interface known as Iub in 3GPP. The UTRAN may have several groups of Node Bs connected to different RNCs; two are shown in the example depicted in FIG. 1. Where more than one RNC is provided in a UTRAN, interRNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

In many wireless communication systems, adaptive transmission power control algorithms are used. In such systems, many communications may share the same radio frequency spectrum. When receiving a specific communication, all the other communications using the same spectrum cause interference to the specific communication. As a result, increasing the transmission power level of one communication degrades the signal quality of all other communications within that spectrum. However, reducing the transmission power level too far results in undesirable received signal quality, such as measured by signal to interference ratios (SIRs) at the receivers. In 3GPP W-CDMA systems, power control is used as a link adaptation method. Dynamic power control is applied for dedicated physical channels (DPCH), such that the transmit power of the DPCHs is adjusted to achieve a quality of service (QoS) with a minimum transmit power level, thus limiting the interference level within the system.

One approach is to divide transmission power control into separate parallel processes, referred to as outer loop power control (OLPC) and inner loop power control (ILPC). Basically, the power level of a specific transmitter is based on a target SIR value. In OLPC, as a receiver receives the transmissions in frame intervals, the quality of the received signal is measured. For a TDD signal, each frame interval comprises a set of time slot divisions. The transmitted information is sent in units of transport blocks (TBs), and the received signal quality can be monitored on a block error rate (BLER) basis. The BLER is estimated by the receiver, typically by a cyclic redundancy check (CRC) of the data. This estimated BLER is compared to a target quality requirement, such a target BLER, representative of QoS requirements for the various types of data services on the channel. Based on the measured received signal quality, a target SIR adjustment control signal is generated per CCTrCH.

In 3GPP wideband code division multiple access (W-CDMA) systems utilizing time division duplex (TDD) mode, the UTRAN (SRNC-RRC) sets the initial target SIR to the WTRU at the call/session establishment and then subsequently continuously adjusts the target SIR of the WTRU during the life term of the call as dictated by the observation of the uplink (UL) BLER measurement.

In closed loop ILPC, the receiver compares a measurement of the received signal quality of each DPCH, such as SIR, to a target SIR. If the SIR exceeds the threshold, a transmit power control (TPC) command to decrease the power level is sent. If the SIR is below the threshold, a TPC command to increase the power level is sent. Typically, the TPC command is +1 or −1 bit multiplexed with data in a dedicated channel to the transmitter. In response to received TPC bits, the transmitter changes its transmission power level of the DPCHs by a predefined step size.

However, if the base station reaches its maximum or minimum downlink power and is no longer able to respond to TPC commands requesting an increase (in the case of maximum power being reached) or decrease (in the case of minimum power being reached), the OLPC algorithm could continue to increase or decrease the target SIR. Further, the base station may not be able to respond to the TPC command bits correctly due to poor signal quality. Eventually, the target SIR could be increased or decreased to such an extent that recovery to the correct value would take a long time, which will adversely impact the performance of the system.

SUMMARY

In a wireless receiver, an apparatus and method is provided for downlink transmit power detection of a base station that limits the power control dynamic range. Transmit power control adjustments occur in step size increments responsive to received signal quality measurements compared to an adjustable target signal quality. A power control dynamic range limiting algorithm is performed, which sets minimum and maximum thresholds for received signal quality measurements; measures a delta power change of received signal quality measurements for a downlink channel over an interval; estimates transmit power step size at the receiver; calculates an aggregate power change based on said delta power change and the estimated transmit power step size; compares the aggregate power value to the minimum and maximum thresholds; and sends a control signal for adjustment of transmit power control. The target signal quality adjustments are deactivated if the aggregate power value is within a predetermined proximity to either the maximum or minimum thresholds, and target signal quality adjustments are activated if the aggregate power value is not within said predetermined proximity to either the maximum or minimum thresholds.

Broadly there is also disclosed a method of transmission power control for a wireless transmit receive unit (WTRU) that transmits data signals in first and second forward channels where the WTRU is configured to make first forward channel power adjustments as a function of target metrics computed by a receiving WTRU based on the data signals as received over the first forward channel. Preferably, the transmitting WTRU is a base station. The method comprises receiving data signals from the WTRU on the first forward channel and on the second forward channel. Target metrics are computed for the WTRU's first forward channel power adjustments based on the detection of predetermined error conditions in the signals received on the first forward channel. A power differential is computed between data signals received on the first forward channel and data signals received on the second forward channel. First forward channel transmission power adjustment signals are sent to the transmitting WTRU on a reverse channel based on the computed target metrics and contingent upon the computed power differential. Preferably, the transmitting WTRU transmits data signals on dedicated and common channels so that the first forward channel signals are downlink dedicated channel signals and the second forward channel signals are downlink common channel signals. In such case, the transmitting first forward channel transmission power adjustment signals on a reverse channel comprises transmitting transmission power adjustment signals for the dedicated downlink channel on an uplink channel.

The method can be implemented in a receiving wireless transmit receive unit (WTRU) that includes a receiver configured to receive data signals from a transmitting WTRU on a first forward channel and data signals from the transmitting WTRU on a second forward channel. A processor is provided that is preferably configured to compute target metrics for implementing first forward channel transmission power adjustments in the transmitting WTRU based on the detection of predetermined error conditions in the data signals received on the first forward channel and to compute a power differential between data signals received on the first forward channel and data signals received on the second forward channel. A transmitter is operatively associated with the processor and configured to transmit first forward channel transmission power adjustment signals on a reverse channel responsive to target metric computations made by said processor and contingent upon a power differential computed by said processor. Preferably, the transmitting WTRU is a base station that transmits data signals on dedicated and common channels so that the receiver is configured to receive downlink data signals on a dedicated channel as the first forward channel received signals and to receive downlink data signals on a common channel as the second forward channel received signals and the transmitter is configured to transmit transmission power adjustment signals for the dedicated downlink channel on an uplink channel.

Other objects and advantages of the present invention will be apparent to persons skilled in the art from the following description and accompanying drawings.

DETAILED DESCRIPTION

Although the embodiments are described in conjunction with a third generation partnership program (3GPP) wideband code division multiple access (W-CDMA) system, the embodiments are applicable to any hybrid code division multiple access (CDMA)/time division multiple access (TDMA) communication system. Additionally, the embodiments are applicable to CDMA systems, in general, such as CDMA2000, TD-SCDMA and the proposed frequency division duplex (FDD) mode of 3GPP W-CDMA.

Figure 2:
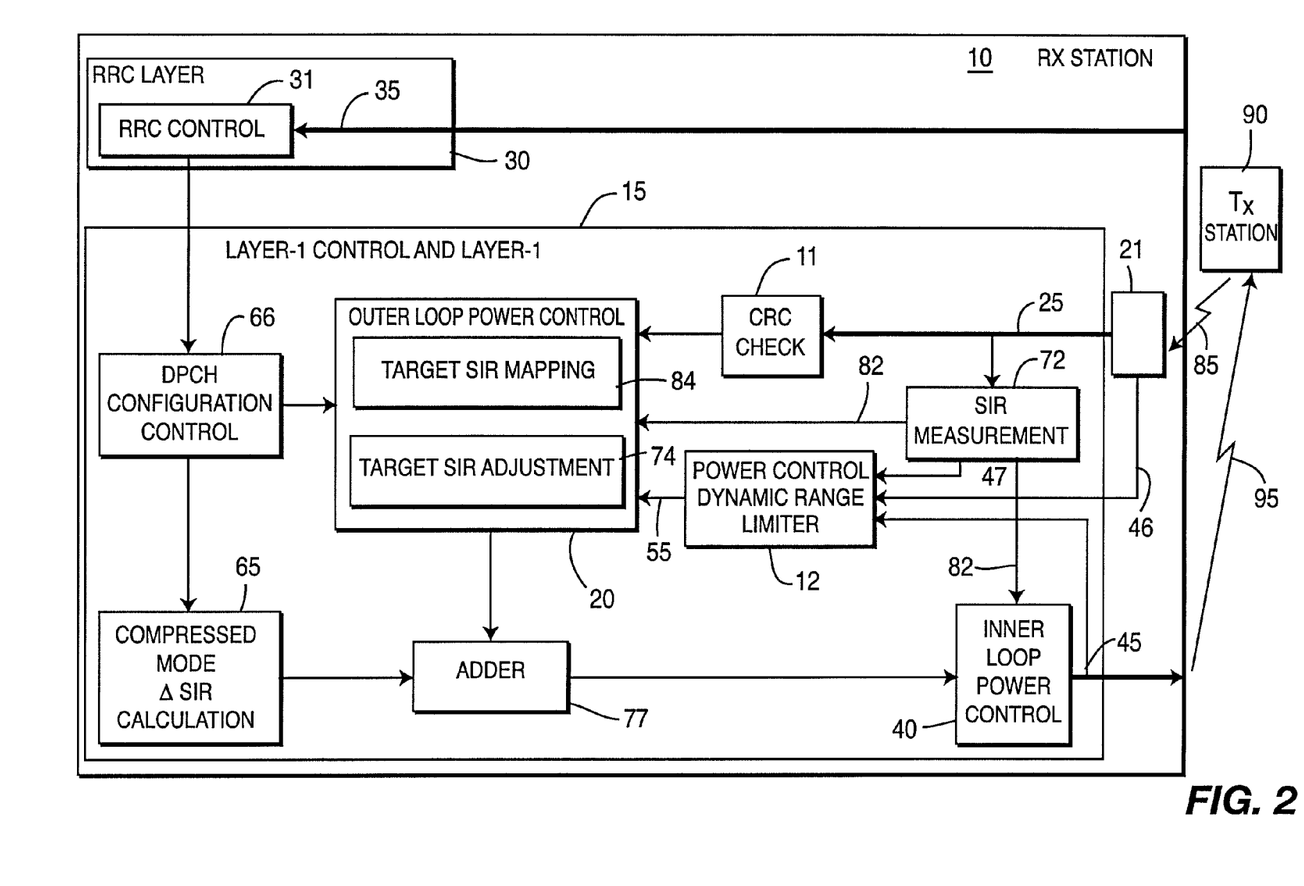
FIG. 2 shows a block diagram of a receiving station which performs OLPC with limits to downlink power control dynamic range in accordance with the present invention.

FIG. 2 shows a block diagram of a WTRU 10, comprising a RRC layer 30 and a Layer 1 Control/Layer 1 entity 15, and RAKE receiver 21. WTRU 10 communicates with base station 90 and receives a downlink communication 85 from base station 90. Downlink communication 85 comprises dedicated physical channel received signal code power (DPCH RSCP), DPCH SIR, and common pilot channel (CPICH) RSCP, which convey downlink transmit power information to WTRU 10.

RRC layer 30 comprises RRC control 31. As part of the initial configuration of a DL dedicated CCTrCH, the SRNC selects and transmits to the WTRU (via RRC signaling) the DL power control-related parameters (e.g. target BLER for each TrCH).

Layer 1 Control/Layer 1 entity 15 comprises CRC check unit 11, SIR measurement unit 72, OLPC unit 20, ILPC unit 40, DPCH configuration control unit 66, compressed mode delta SIR calculation unit 65, adder 77, and power control dynamic range limiter 12. OLPC unit 20 comprises target SIR mapper 84 and target SIR adjustment unit 74.

CRC check unit performs an estimate of BLER on the data. The initial BLER estimate is processed by the target SIR mapper 84 to determine the proper target SIR based on the received signal quality. SIR measurement unit 72 makes real time measurement SIR of the received DPCH signal 25. The SIR measurement 82 is sent to OLPC unit 20 so that necessary adjustments to the target SIR can be made at target SIR adjustment unit 74. SIR measurement 82 is also received by the ILPC unit 40 for comparison to the target SIR. Based on this comparison, the ILPC unit 40 produces the proper TPC command 45 to request base station 90 to increase or decrease transmit power.

The DPCH configuration control unit 66 controls the DCH quality target, such as target BLER for each TrCH, the transmission time interval (TTI), and the number of transport blocks within a TTI. Compressed mode delta SIR calculation unit 65 determines a $\Delta$SIR value for compressed mode received via signaling. Since the DPCH SIR measurements in the compressed mode are higher than the SIR measurements in the normal mode by $\Delta$SIR, the OLPC unit 20 must increase the target SIR for ILPC unit 40 by $\Delta$SIR at adder 77.

DPCH data 25 is received from the Physical layer PHY from the transmitting station 90 and is processed by RAKE receiver 21. CPICH RSCP measurement 46 from RAKE receiver 21, DPCH RSCP 47 from SIR measurement unit 72 and TPC command 45 from ILPC unit 40 are used as inputs to power control dynamic range limiter 12. Power control dynamic range limiter 12 is a processor that performs an algorithm for detecting whether the three following power control problem scenarios are in effect: 1) transmit unit 90 has reached the maximum transmit power; 2) transmit unit 90 has reached the minimum transmit power; or 3) the transmit unit 90 did not properly decode the TPC command 45 due to poor signal quality in the wireless signal 95. Limiter 12 takes the RSCP 47 of the DPCH 25 from SIR measurement unit 72, and calculates a $\Delta$DPCH RSCP value for a predetermined observation interval. The TPC command 45 input is monitored to determine the amount of power change as a result of TPC commands 45 during the observation interval. A third input, received CPICH power 46, is used to determine a $\Delta$CPICH power value during the observation interval. Limiter 12 analyzes these inputs and performs comparisons to predetermined thresholds according to a preferred algorithm to determine whether any of the three aforementioned power control scenarios has occurred.

Based on the result of the limiter 12 algorithm, target SIR adjustment unit 74 receives a control signal 55 to cease target SIR adjustments because any such adjustments are ineffective while the base station is experiencing one of these problem scenarios. Further, if the target SIR adjustments were left alone, the upper or lower bounds for the target SIR would be reached inadvertently because the OLPC unit 20 is incorrectly operating with false signal quality measurements. For example, if the transmit power was at its maximum, and the ILPC unit 40, based on CRC errors, determines that more transmit power is necessary to maintain the measured SIR close to the target SIR, the OLPC unit 20 will attempt to ramp up the target SIR too severely. Since there is no chance for the base station 90 to comply accordingly, such severe ramp up misuses system resources, resulting in longer recovery time. By ceasing target SIR adjustments, the upper and lower bounds of the target SIR are averted, which allows the target SIR in OLPC unit 20 to remain within the preferred operable range, away from the outer limits.

Although FIG. 2 has been described in reference to a WTRU 10 communicating with a base station 90, it should be understood that the present invention can be utilized in an ad hoc communication system, where a second WTRU operates as base station 90.

Figures 3, 3A:
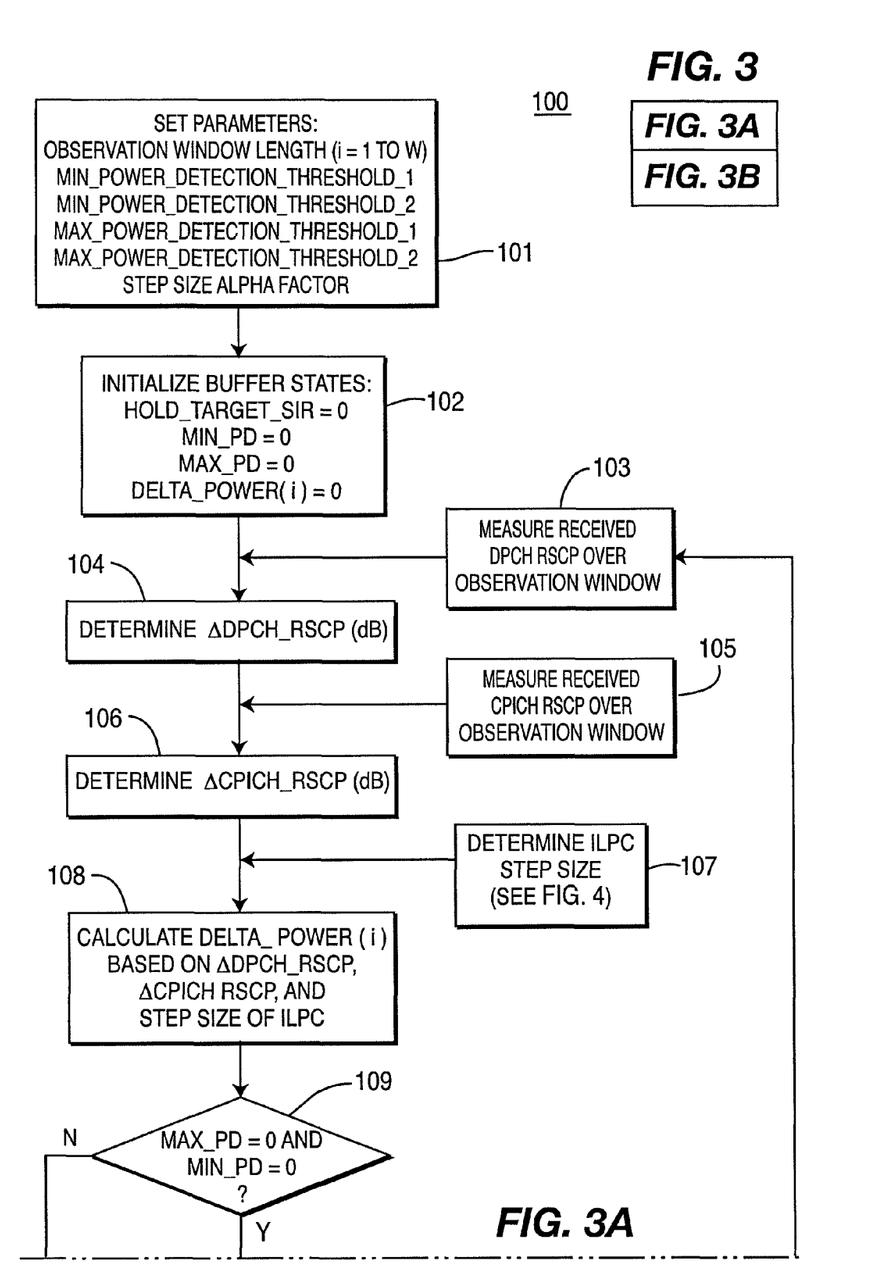
FIGS. 3A and 3B show a method flowchart for a transmit power detection algorithm.
Figure 3B:
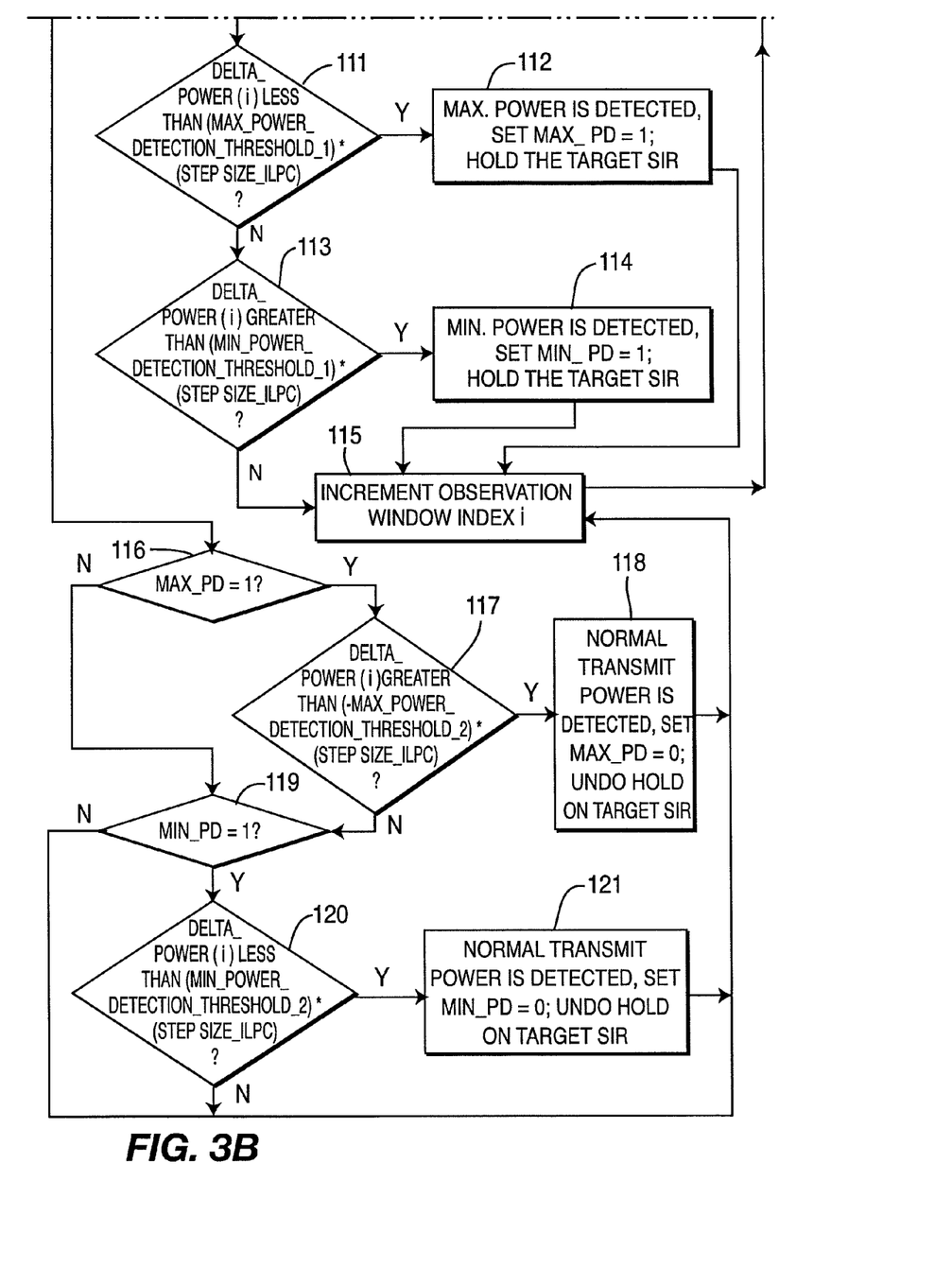

With reference to FIGS. 3A and 3B, an algorithm 100 performed by power control dynamic range limiter 12 is illustrated. Algorithm 100 determines whether the base station is responding to TPC commands by monitoring for either maximum or minimum thresholds of downlink power. The output of algorithm 100 is a control signal to the outer-loop power control indicating whether inner-loop power control has reached maximum or minimum power or is operating at normal transmit power.

Algorithm 100 begins at step 101 where the following parameters are set: an observation window length with index i, Min power_detection_threshold_1, Min_power_detection_threshold_2, Max_power_detection_threshold_1, Max_power_detection_threshold_2, step size alpha factor alpha. The preferred default values for these parameters are shown in Table 1. The window length and threshold parameters are adjusted with respect to the SIR or RSCP of CPICH; the parameters are smaller for higher CPICH SIR and CPICH RSCP values.

TABLE 1

| Parameter | Default Value |
| --- | --- |
| observation_window_length(i) | 8 frames |
| Min_power_detection_threshold_1 | 5 dB |
| Min_power_detection_threshold_2 | 3 dB |
| Max_power_detection_threshold_1 | 5 dB |
| Max_power_detection_threshold_2 | 3 dB |
| alpha | 0.8 |

Next in step 102, the following buffers are initialized and set to zero (0): Hold_Target_SIR, minimum power detected Min_PD, maximum power detected Max_PD, Delta_power (i). Buffers Hold_Target_SIR, Min_PD, and Max_PD retain logical value 0 or 1. Buffer value Delta_power(i) represents a power (dB) value for observation widow time interval index i. Buffer Hold_Target_SIR indicates a value one (1) when either the maximum or minimum power threshold has been detected, and provides a logical control to OLPC for preventing any further adjustments to the target SIR. When a minimum threshold for downlink power is detected, buffer value Min_PD is set to one (Min_PD=1). Likewise, when a maximum power is detected, value Max_PD is set to one (Max_PD=1). In step 103, the received dedicated physical channel received signal code power (DPCH_RSCP) is measured for the duration of the observation window. In step 104, a delta value for the downlink power according to DPCH RSCP is calculated and is shown in Equation 1:

$$\Delta DPCH\_RSCP(i) = DPCH\_RSCP(i) - DPCH\_RSCP(i-1)(dB) \quad \text{Equation 1}$$

In a distributed power control (DPC) algorithm, power updates through feedback occur either every time slot, or with an integral processing delay. For example, the delta power ΔDPCH_RSCP(i) calculated in Equation 1 represents a value for when DPC mode equals zero (0), where the calculated delta power value represents a power change for an interval of two successive time slots. Alternatively, if DPC mode equals one (1), Equation 1 is modified to determine the delta power between the current time slot (i) and some predetermined previous time slot, preferably the third previous time slot (i-3).

In step 105, downlink power is measured based on the common pilot channel RSCP (CPICH RSCP) over the observation window. In step 106, the delta power ΔCPICH_RSCP is calculated according to Equation 2:

$$\Delta CPICH\_RSCP(i) = CPICH\_RSCP(i) - CPICH\_RSCP(i-1)(dB) \quad \text{Equation 2}$$

The delta power ΔCPICH_RSCP(i) calculated in Equation 2 is based on DPC mode equals 0, where the calculated delta power value represents a power change for an interval of two successive time slots. For DPC mode equals 1, Equation 2 is modified to calculate the delta power between the current time slot (i) and a predetermined previous time slot, preferably the third previous time slot (i-3). In step 107, the inner-loop power control (ILPC) step size is determined. The estimation for ILPC step size will be described in further detail in reference to FIG. 4.

In step 108 of FIG. 3A, an aggregate delta power value Delta_power(i), is calculated based on delta DPCH_RSCP, delta CPICH_RSCP, and StepSize_ILPC according to Equations 3 and 4. Equation 3 is used to calculate aggregate delta power when the base station has received a TPC command in the prior time slot for a transmit power increase. Equation 4 is used to calculate aggregate delta power when the base station has received a TPC command in the prior time slot for a transmit power decrease. The only difference between Equations 3 and 4 is whether the step size of ILPC is added or subtracted from the power change values.

$$\text{Delta\_power}(i) = \text{Delta\_power}(i-1) + \Delta DPCH\_RSCP(i) - \Delta CPICH\_RSCP(i) - \text{StepSize\_ILPC} \quad \text{Equation 3}$$

$$\text{Delta\_power}(i) = \text{Delta\_power}(i-1) + \Delta DPCH\_RSCP(i) - \Delta CPICH\_RSCP(i) + \text{StepSize\_ILPC} \quad \text{Equation 4}$$

In step 109, algorithm 100 checks for whether Max_PD and Min_PD buffers are indicating normal transmit power by the base station. If so, algorithm 100 continues to step 111, where value Delta_power(i) is examined for whether the maximum power is detected, by comparing value Delta_power(i) to Max_power_detection_threshold_1 factored with StepSize_ILPC as shown in Equation 5:

$$\text{Delta\_power}(i) < -\text{Max\_power\_detection threshold\_1} * \text{StepSize\_ILPC} \quad \text{Equation 5}$$

If value Delta_power(i) is less than the threshold according to Equation 5, the maximum power has been detected and buffer value Max_PD is set to one (Max_PD=1) and value Hold_Target_SIR is set to one (1), as shown in step 112. If the maximum power has not been detected according to step 111, a comparison is made against the minimum power detection threshold Min_power_detection_threshold_1 according to step 113, according to Equation 6:

$$\text{Delta\_power}(i) > \text{Min\_power\_detection\_threshold\_1} * \text{StepSize\_ILPC} \quad \text{Equation 6}$$

If in step 113, value Delta_power(i) is greater than the product of Min_power_detection_threshold_1 and StepSize_ILPC, then the minimum power is detected. In step 114 when the minimum power is detected, buffers Min_PD and Hold_Target_SIR are set to one (1). If neither minimum nor maximum power detection occurs in steps 111, 113, the observation window index is incremented at step 115, and algorithm 100 returns to step 103 and continues from there. If either the maximum or minimum downlink power is detected at steps 112 or 114, the change in buffer states Max_PD, Min_PD, and Hold_Target_SIR are sent to OLPC unit 20 so that the target SIR can be held at its present value.

The remaining steps of algorithm 100 shown in FIG. 3B are for detecting whether the downlink transmit power has returned to normal. Returning to step 109, if neither buffer states Max_PD nor Min_PD are currently equal to zero, steps 116 and 119 are used to determine which of these buffers Max_PD, Min_PD contain a value equal to one (1). At step 116, buffer Max_PD is checked for whether the maximum downlink power has been detected (Max_PD=1). If so, the process proceeds to step 117 where value Delta_power(i) is compared against the product of the Max_power_detection_threshold_2 and step size ILPC as shown in Equation 7.

$$\text{Delta\_power}(i) > -\text{Max\_power\_detection\_threshold\_2} * \text{StepSize\_ILPC} \quad \text{Equation 7}$$

If the result of the comparison is true, then a normal transmit power has been detected, and buffer value Max_PD is reset to zero (0), which releases the hold on the target SIR for outer-loop power control (step 118).

If the comparison of step 117 is not true, then step 119 commences for checking whether a minimum downlink power detection has occurred (Min_PD=1). If current state of the transmit power is at minimum power detection, then value Delta_power(i) is compared to Min_power_detection_threshold_2 as shown in Equation 8 (step 120).

$$\text{Delta\_power}(i) < \text{Min\_power\_detection\_threshold\_2} * \text{StepSize\_ILPC} \quad \text{Equation 8}$$

If the result of the Equation 8 comparison is true, then normal transmit power is detected and buffer value Min_PD is reset to zero (0), which releases the hold on target SIR for outer-loop power control (step 121). If however, the result of step 120 is not true, then the observation window index is incremented at step 115, and algorithm 100 repeats beginning at step 103 for the remainder of the observation window. If the observation window index (i) has reached the final value for observation window length, and steps 111, 113, 117 or 120 have failed to detect either minimum power, maximum power or normal transmit power, then value Delta_power(i) is reset to 0 and initialized for a new observation window.

In an alternative embodiment, downlink power detection is measured using the difference of SIR measurements (dB) between adjacent time slots for both the downlink DPCH and the CPICH instead of the RSCP measurement values. Since the SIR value is proportional to the ratio of RSCP/interference (i.e., the SIR varies with interference power), the RSCP value is preferred for downlink power detection in algorithm 100. Under the alternative approach, the calculation of aggregate power value Delta_Power(i) reduces to the following Equation 9 in the case when the transmit power is not at the minimum or maximum level:

$$\text{Delta\_power}(i) = [\text{Delta\_power}(i-1) + \Delta\text{DPCH\_SIR}(i) - \Delta\text{CPICH\_SIR}(i) - (TPC(i-1))(\text{StepSize\_ILPC})]$$
$$= [\text{Delta\_power}(i-1) + (TPC(i-1))(\text{StepSize\_ILPC})] \quad \text{Equation 9}$$

where TPC command value TPC equals positive or negative one (TPC=1, −1).

Figure 4:
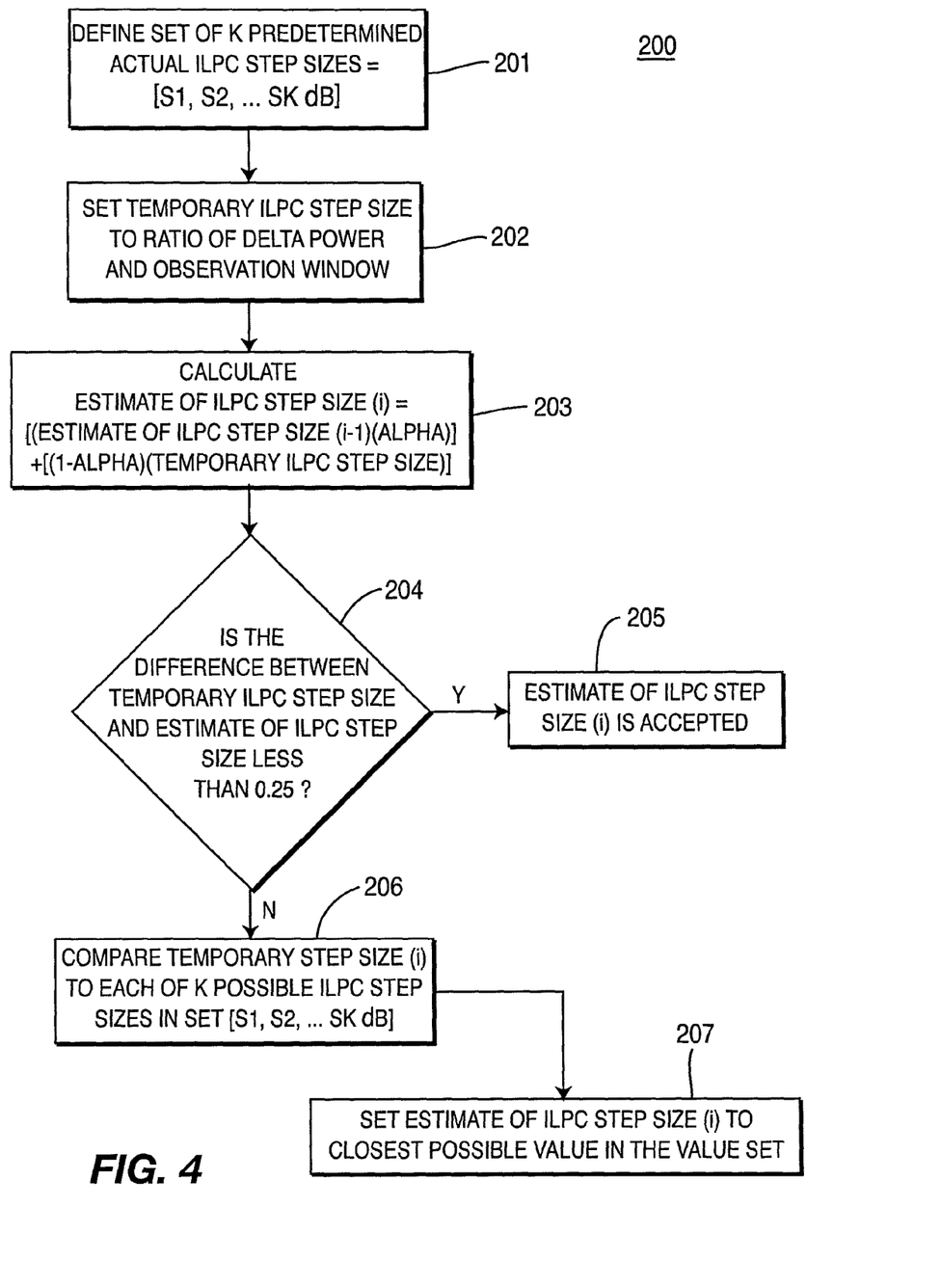
FIG. 4 shows a method flowchart for estimation of ILPC step size used in the algorithm shown in FIGS. 3A and 3B.

FIG. 4 shows algorithm 200 for determining the inter-loop power control step size used in algorithm 100. At step 201, a set of k pre-determined actual ILPC step sizes [S1, S2, ..., Sk dB] are established. Preferably, the set of ILPC step sizes are [0.5, 1.0, 1.5, 2.0 dB]. Although these are the preferred values for the set of ILPC step sizes, the set may comprise more than four values, and the values may be different than these presented. In step 202, a temporary ILPC step size is set according to Equation 10.

$$\text{Temp\_StepSize\_ILPC} = |\text{Delta\_power}(i)|/\text{observation\_window\_length} \quad \text{Equation 10}$$

In step 203, the estimate of the ILPC step size for the current time slot is calculated using Equation 11, where the estimate is based on the estimate of the prior time slot, the step size alpha factor alpha, and the temporary ILPC step size Temp_StepSize_ILPC from step 202.

$$\text{StepSize\_ILPC}(i) = (\text{alpha})(\text{StepSize\_ILPC}(i)) + (1-\text{alpha})(\text{Temp\_StepSize\_ILPC}) \quad \text{Equation 11}$$

The alpha factor numerically represents updating the new estimate through a single pole low pass filter. Next, in step 204, the difference between the temporary ILPC step size Temp_StepSize_ILPC and the estimate of ILPC step size StepSize_ILPC(i) is compared to a threshold of 0.25. If the difference is less than 0.25, then the estimate of ILPC step size StepSize_ILPC(i) is considered satisfactory (step 205). If, however, the difference is greater than or equal to 0.25, then the estimate of ILPC step size is compared in step 206 to each of the possible ILPC step sizes in the set established in step 201. The comparison delta value Delta_StepSize for step 206 is calculated for k trials using Equation 12:

$$\text{Delta\_StepSize} = |\text{Temp\_StepSize\_ILPC} - \text{Value\_StepSize}(k)| \quad \text{Equation 12}$$

where k is an integer value representing the number of possible ILPC step sizes, and Value_StepSize(k) is a possible ILPC step size.

Once the comparison of the estimate of ILPC step size is made to each of K possible ILPC step sizes of the set, the final estimate of ILPC step size(i) is set to the closest possible value within the value set (step 207).

Once either a minimum transmit power is detected or a maximum transmit power is detected, its status will be kept until the normal transmit power is detected in detection algorithm 100.

What is claimed is:

1. A method implemented in a wireless transmit/receive unit (WTRU) for power control of a wireless communication, comprising:
   receiving data signals from a base station on a dedicated physical channel;
   receiving data signals from the base station on a common pilot channel;
   determining a received signal code power change for the data signals received on the dedicated physical channel ($\Delta$DPCH_RSCP) over an observation period;
   determining a received signal code power change for the data signals received on the common pilot channel ($\Delta$CPICH_RSCP) over an observation period;
   determining a power differential between the determined power changes $\Delta$DPCH_RSCP and $\Delta$CPICH_RSCP;
   determining target metrics for power adjustments of the dedicated physical channel based on detection of predetermined error conditions in the signals received on the dedicated physical channel; and
   transmitting power adjustment signals to the base station based on the determined target metrics and on the determined power differential.

2. The method as in claim 1, wherein the transmitting to the base station power adjustment signals is on a condition that the determined power differential is within a predetermined proximity to either a predetermined minimum threshold or a predetermined maximum threshold.

3. The method as in claim 2, further comprising performing estimation of a transmit power control step size and using the step size estimation for the determining of the power differential.

4. A wireless transmit/receive unit (WTRU) comprising:
   a receiver configured to receive data signals from a base station on a dedicated physical channel and data signals from the base station on a common pilot channel;
   a processor configured to determine target metrics for implementing power adjustments of the dedicated physical channel based on the detection of predetermined error conditions in the data signals received on the dedicated physical channel;
   the processor configured to determine a power differential between a computed received signal code power change for the data signals received on the dedicated physical channel over an observation period, and a received signal code power change for the data signals received on the common pilot channel over an observation period; and
   a transmitter operatively associated with the processor and configured to transmit the power adjustments of the dedicated physical channel to the base station based upon the determined power differential.

5. The WTRU as in claim 4, wherein the transmitter transmits power adjustment signals to the base station on a condition that the determined power differential is within a predetermined proximity to either a predetermined minimum threshold or a predetermined maximum threshold.

6. The WTRU as in claim 4, wherein the processor is configured to perform estimation of a transmit power control step size and to use the step size estimation for the determining of the power differential.

* * * * *